(12) United States Patent
Fields, Jr. et al.

(10) Patent No.: US 7,984,256 B2
(45) Date of Patent: Jul. 19, 2011

(54) DATA PROCESSING SYSTEM AND METHOD IN WHICH A PARTICIPANT INITIATING A READ OPERATION PROTECTS DATA INTEGRITY

(75) Inventors: James S. Fields, Jr., Austin, TX (US); Guy L. Guthrie, Austin, TX (US); John T. Hollaway, Jr., Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1314 days.

(21) Appl. No.: 11/250,022

(22) Filed: Oct. 13, 2005

(65) Prior Publication Data

US 2007/0088926 A1 Apr. 19, 2007

(51) Int. Cl.
*G06F 12/00* (2006.01)
*G06F 13/00* (2006.01)
*G06F 13/28* (2006.01)

(52) U.S. Cl. ........................................ 711/163; 711/152

(58) Field of Classification Search .................. None
See application file for complete search history.

(56) References Cited

U.S. PATENT DOCUMENTS
6,892,283 B2 * 5/2005 Arimilli et al. ............... 711/148
* cited by examiner

*Primary Examiner* — Kevin L Ellis
*Assistant Examiner* — Gary W Cygiel
(74) *Attorney, Agent, or Firm* — Dillon & Yudell LLP

(57) ABSTRACT

A data processing system includes a plurality of requestors and a memory controller for a system memory. In response to receiving from the requestor a read-type request targeting a memory block in the system memory, the memory controller protects the memory block from modification, and in response to an indication that the memory controller is responsible for servicing the read-type request, the memory controller transmits the memory block to the requestor. Prior to receipt of the memory block by the requestor, the memory controller ends protection of the memory block from modification, and the requestor begins protection of the memory block from modification. In response to receipt of the memory block, the requestor ends its protection of the memory block from modification.

20 Claims, 8 Drawing Sheets

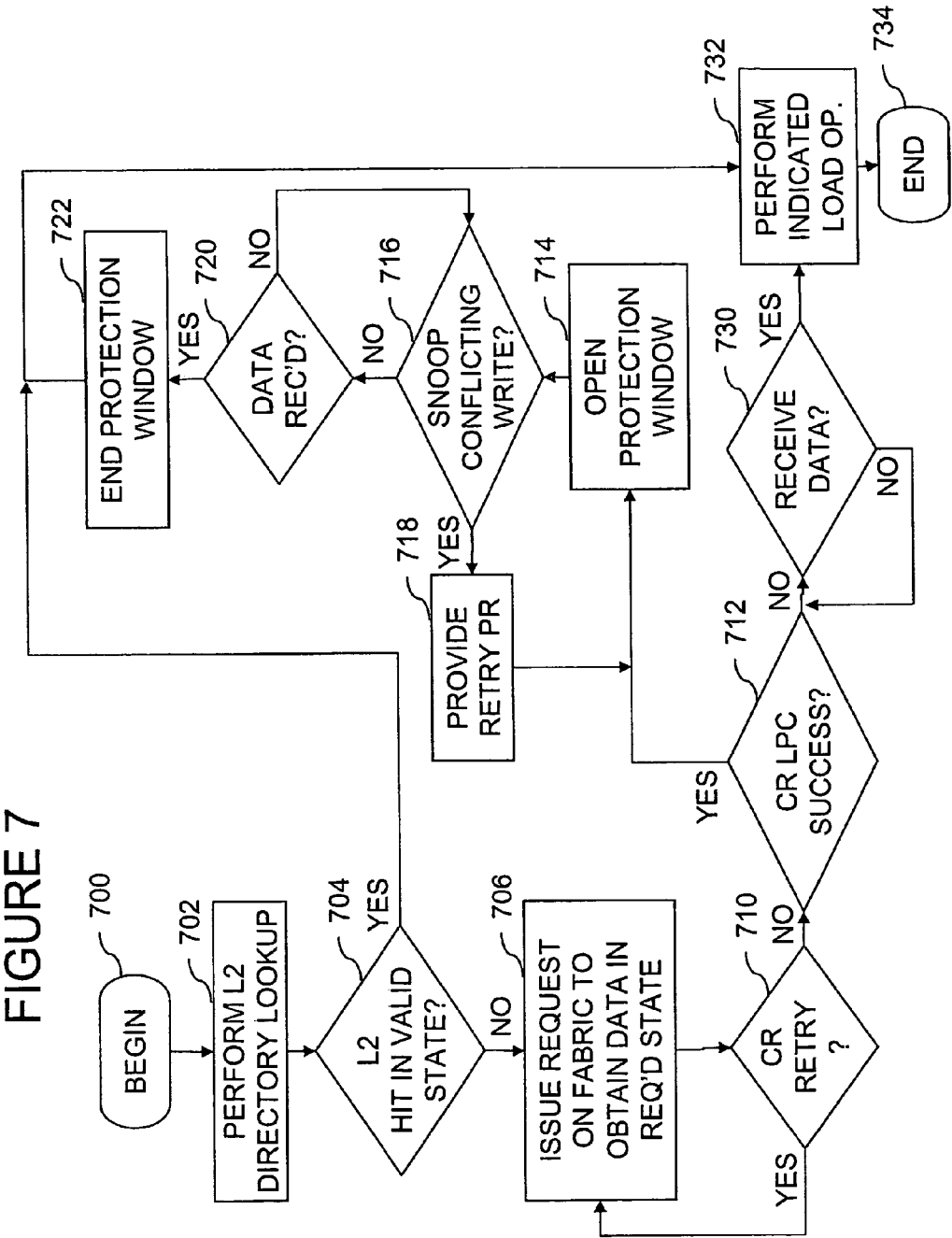

DATA PROCESSING SYSTEM AND METHOD IN WHICH A PARTICIPANT INITIATING A READ OPERATION PROTECTS DATA INTEGRITY

BACKGROUND OF THE INVENTION

1. Technical Field

The present invention relates in general to data processing and, in particular, to read operations in a data processing in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A coherency protocol typically defines a set of cache states stored in association with the cache lines of each cache hierarchy, as well as a set of coherency messages utilized to communicate the state information between the cache hierarchies and other participants, such as system memory. In a typical implementation, the cache state information takes the form of the well-known MESI (Modified, Exclusive, Shared, Invalid) protocol or a variant thereof, and the coherency messages indicate a protocol-defined coherency state transition and/or data update in the cache hierarchy of the requestor and/or the recipients of a memory access request.

SUMMARY OF THE INVENTION

In a conventional coherency protocol, a system memory controller responsible for servicing a read operation must protect the data targeted by the read operation from modification, for example, by a subsequent write operation, from the time that the system memory controller is assigned responsibility for servicing the read operation until the read data is delivered to the requestor. A conventional system memory controller protects the data through the allocation of a read queue entry including an address register and an address comparator. Because modern data processing systems typically utilize large (e.g., 40-50 bit) addresses, each individual read queue entry has a large "footprint" within the integrated circuit containing the system memory controller, and hence in commercially available systems, only a small number of read queue entries are typically instantiated. The small number of read queue entries and the duration of the tenure of read operations in the read queue entries constrain the rate at which read operations can be serviced by the system memory controller.

In view of the foregoing and other shortcomings in the art, the present invention provides an improved data processing system and method of data processing in a data processing system. In one embodiment, a data processing system includes a plurality of requestors and a memory controller for a system memory. In response to receiving from the requestor a read-type request targeting a memory block in the system memory, the memory controller protects the memory block from modification, and in response to an indication that the memory controller is responsible for servicing the read-type request, the memory controller transmits the memory block to the requestor. Prior to receipt of the memory block by the requestor, the memory controller ends protection of the memory block from modification, and the requestor begins protection of the memory block from modification. In response to receipt of the memory block, the requestor ends its protection of the memory block from modification.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 7 is a high level logical flowchart of an exemplary method by which a cache memory services a processor load operation in accordance with the present invention.

DETAILED DESCRIPTION OF ILLUSTRATIVE EMBODIMENT

Figure 1:
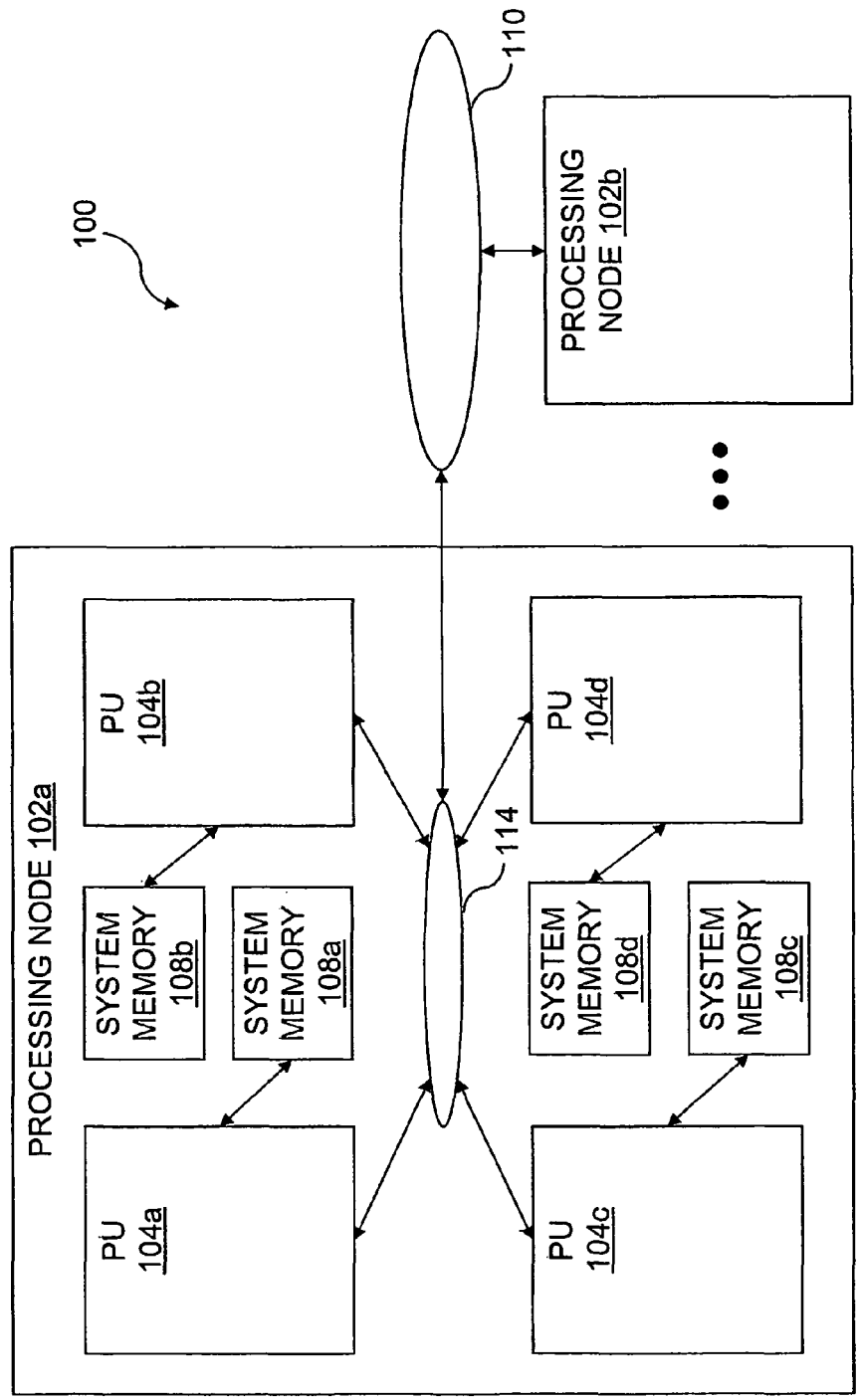
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
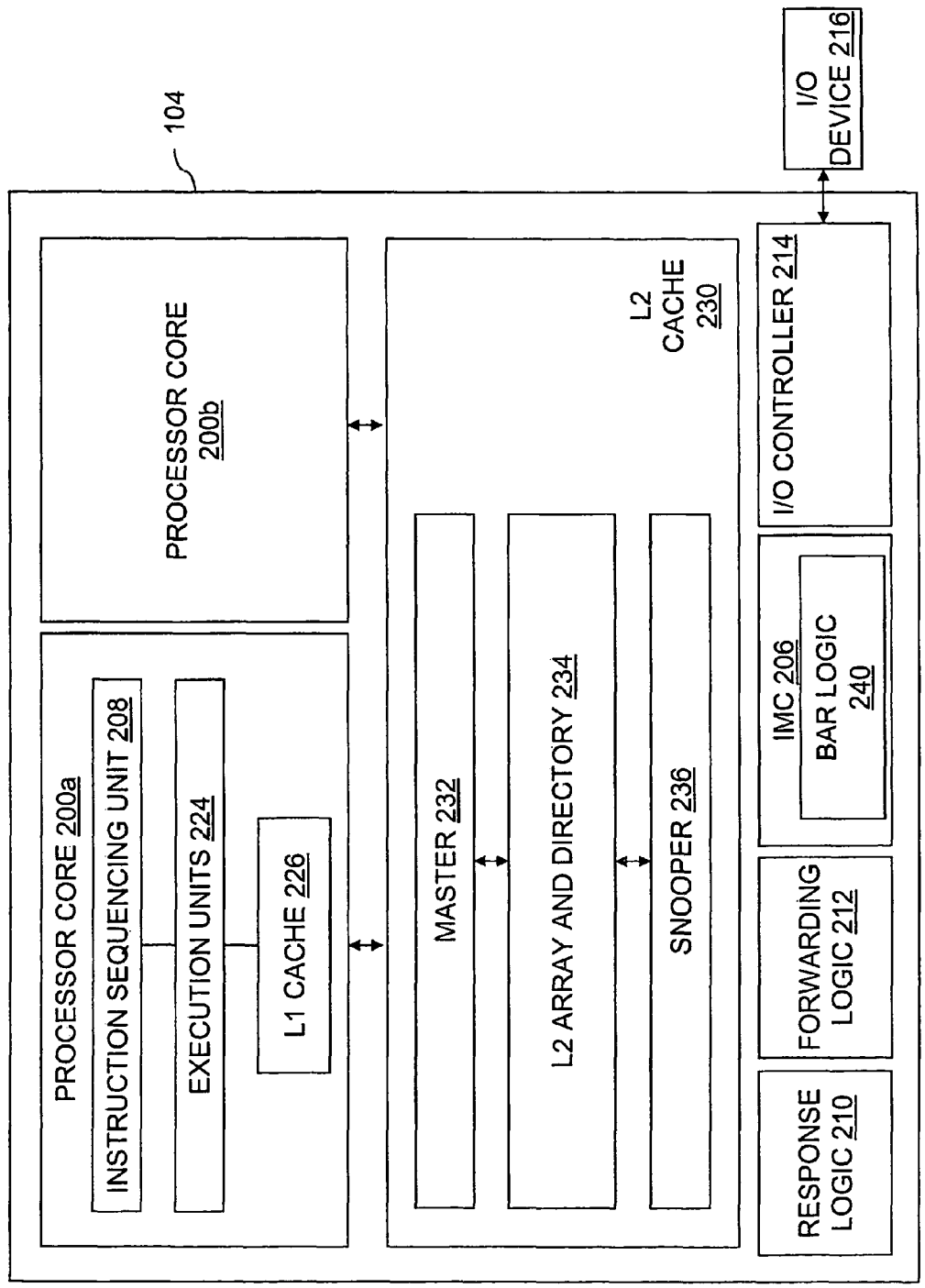
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped on the local interconnect 114.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234, a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which as discussed further below, implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. As described further below, I/O controller 214 may issue operations on local interconnect 114 and/or system interconnect 110 in response to requests by I/O device 216.

Figure 3:
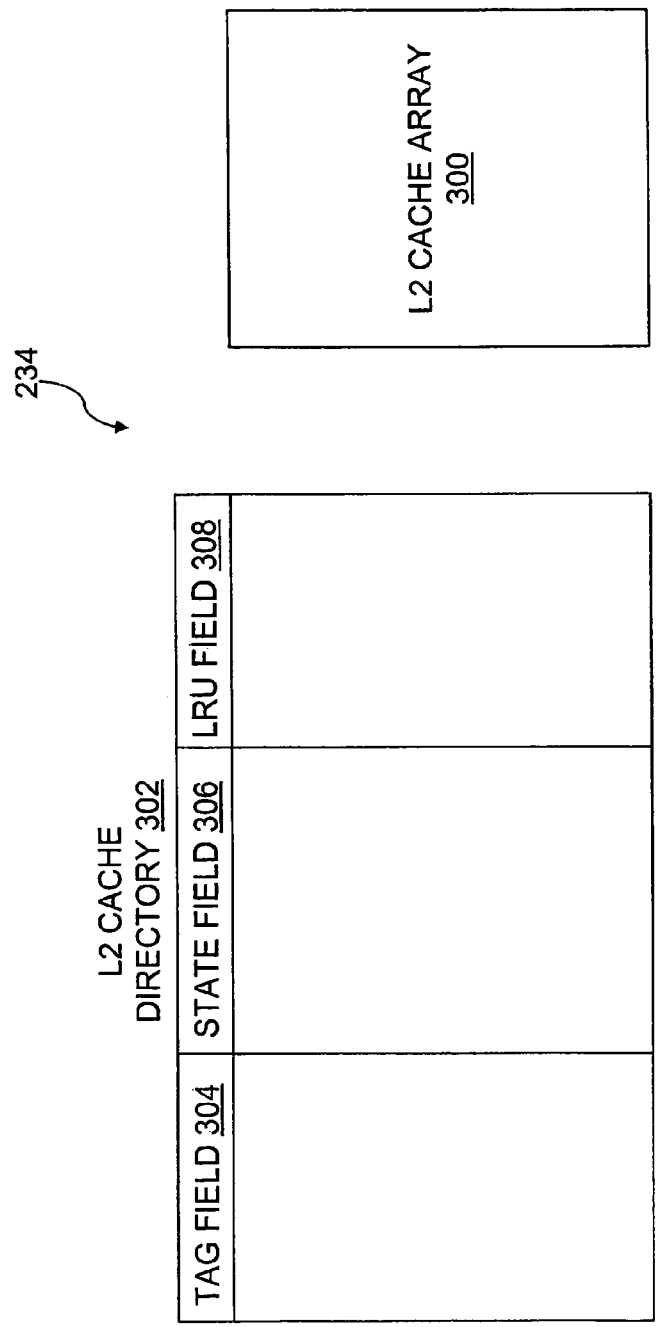
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

Figure 4:
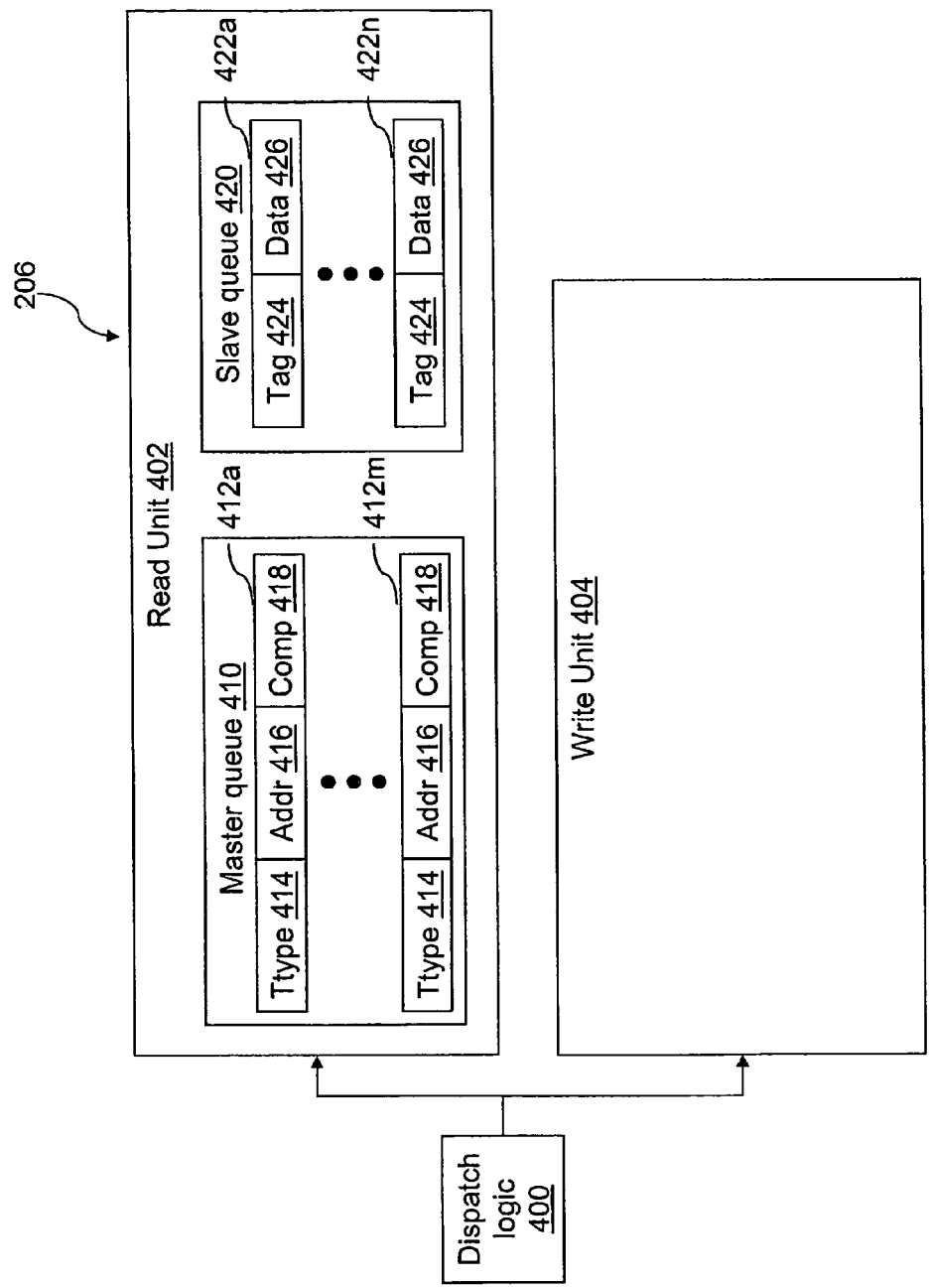
FIG. 4 is a more detailed block diagram of the memory controller depicted in FIG. 2.

Referring now to FIG. 4, there is depicted a more detailed block diagram of an integrated memory controller (IMC) 206 of FIG. 1. As shown, IMC 206 includes dispatch logic 400, a read unit 402 for servicing read requests and a write unit 404 for servicing write requests. Dispatch logic 400 receives requests snooped on local interconnect 114 and dispatches the requests to read unit 402 and write unit 404 based upon transaction type (Ttype). That is, dispatch logic 400 dispatches read-type requests to read unit 402 and write requests to write unit 404.

As further shown in FIG. 4, read unit 402 includes a master queue 410 containing a plurality of master queue entries 412a-412m. Each master queue entry 412 has a respective Ttype field 414 for storing the Ttype of a read-type request, address field 416 for storing at least the high order bits of the associated read target address, and an address comparator 418 for detecting write operations that conflict with the read target address in address field 416.

Read unit 420 also includes a slave queue 420 containing a plurality of slave queue entries 422a-422n each having a tag field 424 for storing a master tag identifying a master of a read request and a data field 426 for buffering the read data requested by the read request. By virtue of the fact that slave queue entries 422a-422n lack an address field 416 and an address comparator 418, slave queue entries 422 are physically smaller than master queue entries 412 and therefore can be instantiated in greater numbers within a given area of the integrated circuit.

Figure 5A:
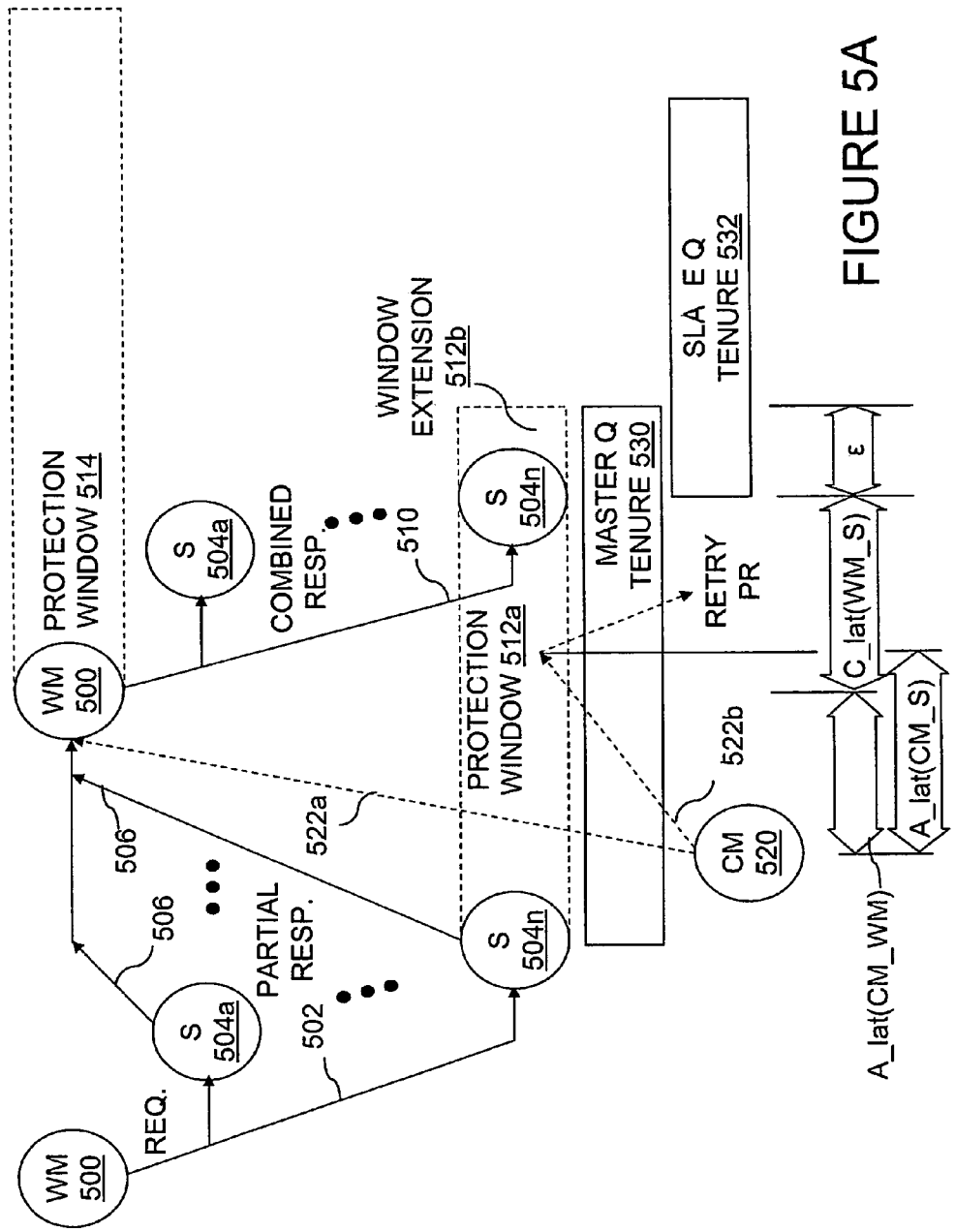
FIGS. 5A-5B are time-space diagrams of exemplary operations during which a memory controller and a requestor protect read data against modification.
Figure 5B:
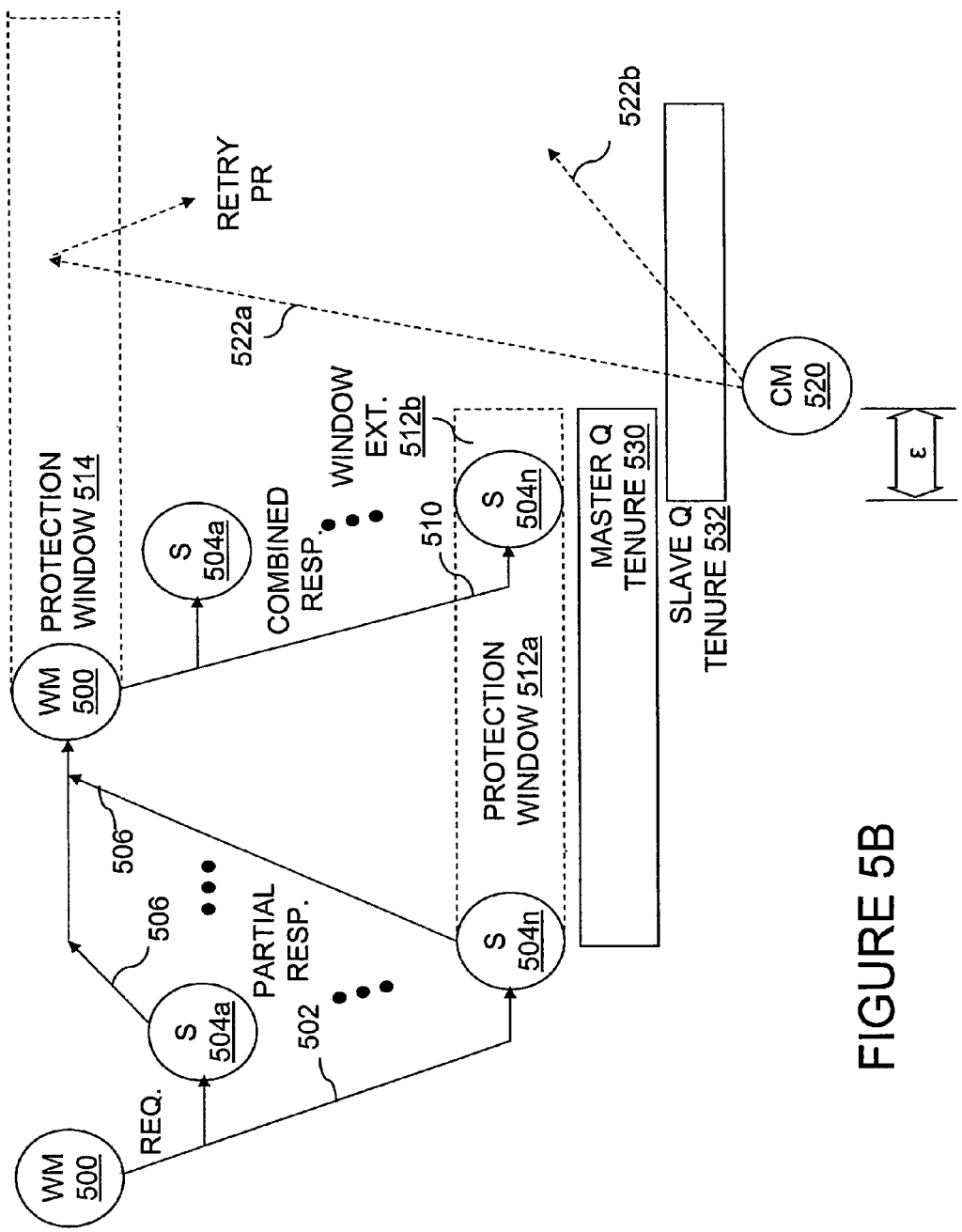

With reference now to FIGS. 5A-5B, there are depicted time-space diagrams of exemplary operations on the interconnect fabric of data processing system 100 of FIG. 1, which respectively illustrate the protection of the target memory block by an LPC snooper and the winning master of the operations. As shown, an operation begins when a winning master (WM) 500 (e.g., a master 232 of an L2 cache 230) issues a request 502 (e.g., a read request) on the interconnect fabric. Request 502 preferably includes at least a transaction type (Ttype) indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to update an entire memory block in lower level memory without regard to its present state and requires destruction of other copies, if any |
| PARTIAL WRITE | Requests authority to update a partial memory block without regard to its present state and causes any modified copy of the memory block to be evicted from a higher level memory to a lower level memory in advance of the update and causes any unmodified copy, if present, of the memory block to be destroyed |

Further details regarding these operations and an exemplary cache coherency protocol that facilitates efficient handling of these operations may be found in the copending U.S. patent application Ser. No. 11/055,305 incorporated by reference herein.

Request 502 is received by snoopers 504, for example, snoopers 236 of L2 caches 230 and IMCs 206, distributed throughout data processing system 100. In general, with some exceptions, snoopers 236 in the same L2 cache 110 as the master 232 of request 502 do not snoop request 502 (i.e., there is generally no self-snooping) because a request 502 is transmitted on the interconnect fabric only if the request 502 cannot be serviced internally by a processing unit 104. Snoopers 504a-504n that receive and process requests 502 each provide a respective partial response 506 representing the response of at least that snooper 504 to request 502. An IMC 206 determines the partial response 506 to provide based, for example, upon whether the IMC 206 is responsible for the request address as indicated by base address register logic 240 and upon whether it has resources available to service the request. A snooper 236 of an L2 cache 230 may determine its partial response 506 based on, for example, the availability of its L2 cache directory 302, the availability of a snoop logic instance within snooper 236 to handle the request, and the coherency state associated with the request address in L2 cache directory 302.

The partial responses 506 of snoopers 504a-504n are logically combined either in stages or all at once by one or more instances of response logic 210 to determine a combined response (CR) 510 to request 502. In one preferred embodiment, which will be assumed hereinafter, the instance of response logic 210 responsible for generating combined response 510 is located in the processing unit 104 containing the winning master 500 that issued request 502. Response logic 210 provides combined response 510 to winning master 500 and snoopers 504 via the interconnect fabric to indicate the response (e.g., success, failure, retry, etc.) to request 502. If CR 510 indicates success of request 502, CR 510 may indicate, for example, a data source for a requested memory block, a cache state in which the requested memory block is to be cached by winning master 500, and whether "cleanup" operations invalidating the requested memory block in one or more L2 caches 230 are required.

In response to receipt of combined response 510, one or more of winning master 500 and snoopers 504 typically perform one or more operations in order to service request 502. These operations may include supplying data to winning master 500, invalidating or otherwise updating the coherency state of data cached in one or more L2 caches 230, performing castout operations, writing back data to a system memory 108, etc. If required by request 502, a requested or target memory block may be transmitted to or from winning master 500 before or after the generation of combined response 510 by response logic 210.

The behavior of snooper 504 in response to a request 502 can be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230.

Still referring to FIG. 5A, the HPC, if any, for a memory block referenced in a request 502, or in the absence of an HPC, the LPC of the memory block, preferably has the responsibility of protecting a memory block, if necessary, in response to a request 502. In the exemplary scenario shown in FIG. 5A, an LPC snooper 504n (e.g., memory controller 206) for the memory block specified by the request address of request 502 protects the requested memory block for winning master 500 during a protection window 512a that extends from the time that snooper 504n determines its partial response 506 until snooper 504n receives combined response 510 and during a subsequent window extension 512b extending a topology-dependent time beyond receipt by snooper 504n of combined response 510. During protection window 512a and window extension 512b, LPC snooper 504n protects the target memory block of request 502 by providing a retry partial response 506 to another competing request 522 specifying the same request address (a single competing request 522 is labeled as 522a when received at winning master 500 and 522b when received at LPC snooper 504n). It should be noted that, in the period prior to generation of combined response 510 at winning master 500, winning master 500 cannot protect the requested memory block in response to competing request 522a because winning master 500 has not yet been informed that it has been selected as the "winner" over other competing master(s) 520 vying for ownership of the requested memory block. Consequently, LPC snooper 504n protects the requested memory block by providing a retry partial response to any conflicting request 522b until the of window extension 512b. At the end of window extension 512b, protection responsibility is transferred to master 500 in accordance with the present invention.

It should be appreciated that in a conventional data processing system, a system memory controller responsible for servicing a read operation must protect the data targeted by the read operation from modification by a subsequent write operation from the time that the system memory controller is assigned responsibility for servicing the read operation until the read data is delivered to the requestor. As noted above, such protection is enforced by a physically large read queue entry at the system memory controller that includes an address register and an address comparator. The present invention appreciates, however, that the winning master 500 also allocates to the read operation a queue entry including an address and an address comparator and that the winning master's queue entry is deallocated in response to completion of the read operation (i.e., in response to receipt of the requested memory block). Consequently, it is possible to transfer responsibility for protecting the target memory block of the read operation from the system memory controller to the winning master 500 (and to deallocate the master read queue entry 412 allocated to the read request) prior to receipt of the requested memory block by winning master 500. In accordance with an embodiment of the present invention, this transfer of protection responsibility is made upon receipt of the combined response by winning master 500.

FIG. 5B accordingly depicts winning master 500 initiating a protection window 514 to protect the memory block requested in request 502 from conflicting memory access request 522a following receipt of combined response 510 and until the end of the data phase. For read-type requests, protection window 514 terminates upon receipt of the requested data by winning master 500. As indicated, winning master 500 protects the target memory block by providing a retry partial response 506 to a conflicting request 522a specifying the same request address. It should be noted that LPC snooper 504n receives conflicting request 522b following termination of window extension 512b and therefore cannot protect the requested memory block by providing a retry partial response.

Protection window 512a and window extension 512b must together be of sufficient duration to protect the transfer of coherency ownership and/or protection responsibility of the requested memory block from snooper 504n to winning master (WM) 500 in the presence of a competing request 522 by a competing master (CM) 520. To ensure that protection window 512a and window extension 512b have sufficient duration to protect the transfer of coherency ownership and/or protection responsibility for the requested memory block from snooper 504n to winning master 500, the latency of communication between processing units 104 is preferably constrained such that the following conditions are met:

$$A\_lat(CM\_S) \leq A\_lat(CM\_WM) + C\_lat(WM\_S) + \epsilon,$$

where A_lat(CM_S) is the address latency of any competing master (CM) 520 to the snooper (S) 504n owning coherence of the requested memory block, A_lat(CM_WM) is the address latency of any competing master (CM) 520 to the "winning" master (WM) 500 that is awarded coherency ownership by snooper 504n, C_lat(WM_S) is the combined response latency from the time that the combined response is formed by response logic 210 at the winning master (WM) 500 to the time the combined response is received by the snooper (S) 504n owning the requested memory block, and epsilon ($\epsilon$) is the duration of window extension 512b.

If the foregoing timing constraint, which is applicable to a system of arbitrary topology, is not satisfied, the request 522 of the competing master 520 may be received (1) by winning master 500 prior to winning master 500 assuming coherency ownership and/or initiating protection window 514 and (2) by snooper 504n after protection window 512a and window extension 512b end. In such cases, neither winning master 500 nor snooper 504n will provide a partial response to competing request 522 that prevents competing master 520 from assuming coherency ownership of the memory block and erroneously reading or writing data in system memory. However, to avoid this coherency error, window extension 512b can be programmably set (e.g., by appropriate setting of a configuration register) to an arbitrary length ($\epsilon$) to compensate for latency variations or the shortcomings of a physical implementation that may otherwise fail to satisfy the timing constraint that must be satisfied to maintain coherency. Thus, by solving the above equation for $\epsilon$, the ideal length of window extension 512b for any implementation can be determined.

Figure 6:
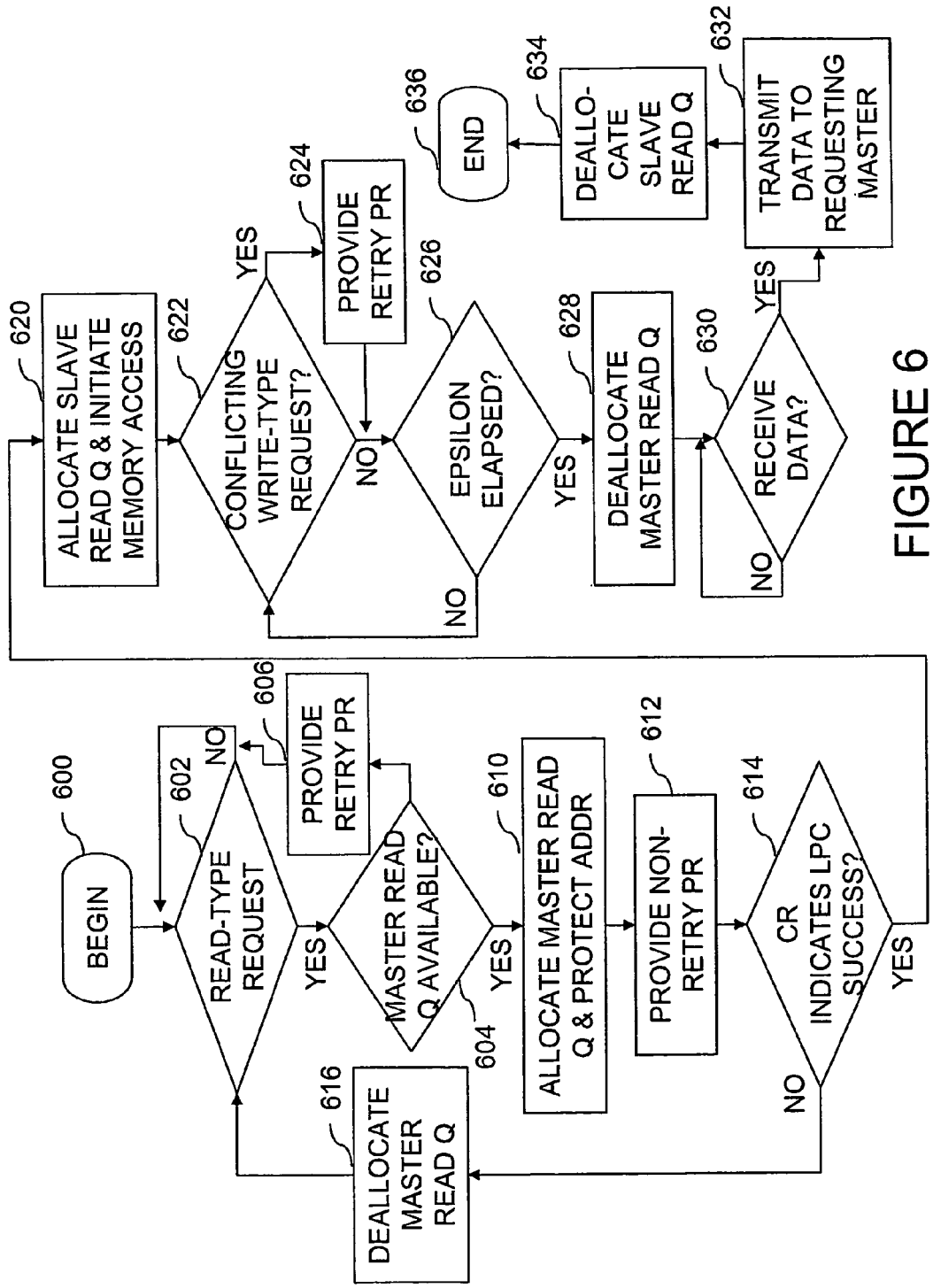
FIG. 6 is a high level logical flowchart of an exemplary method by which a system memory controller services a read request in accordance with the present invention.

With reference to FIG. 6, there is illustrated a high level logical flowchart of an exemplary method by which the read unit 402 of memory controller 206 services a read-type request in accordance with the present invention. The process begins at block 600 and thereafter proceeds to block 602, which illustrates read unit 402 iterating at block 602 until a read-type request is received from an L2 master 232 via local interconnect 114 and dispatch unit 400. In response to receipt of a read-type request, read unit 402 determines at block 604 whether or not a master read queue entry 412 is available for allocation. If not, read unit 402 provides a retry partial response (PR) to the read-type request at block 606, and the process returns to block 602.

In response to a determination at block 604 that a master read queue entry 412 is available, read unit 402 allocates a master read queue entry 412 to the read-type request (beginning tenure 530 of FIGS. 5A-5B) and places the Ttype and target address specified in the read-type request within fields 414 and 416, respectively, of the allocated master read queue entry 412. The allocated master read queue entry 412 then begins to protect the read target address from any conflicting write-type operations utilizing address comparator 418.

The process proceeds from block 610 to block 612, which depicts read unit 402 providing an appropriate partial response for the read-type request and transmitting the partial response on local interconnect 114. Next, the process proceeds to block 614 in response to read unit 402 receiving a combined response for the read-type request. If the combined response indicates that read unit 402 is responsible for providing the data requested by the read-type request (i.e., the combined response is an LPC Success combined response), the process passes to block 620, which is described below. If, however, the combined response is not an LPC Success combined response, read unit 402 deallocates the master read queue entry 412 allocated to the read-type request, and the process returns to block 602, which has been described.

Referring now to block 620, read unit 402 next allocates a slave read queue entry 422 to the read-type request (beginning tenure 532 of FIGS. 5A-5B), and places a data tag identifying the master 232 that originated the read-type operation within the tag field 424 of the allocated slave read queue entry 422. In addition, read unit 402 initiates read access to system memory 108 with the read target address specified within address field 416. As indicated in FIG. 5A, during the interval between receipt of the LPC Success combined response and the termination of a window extension 512b of length epsilon ($\epsilon$), master read queue entry 412 protects the target memory block identified by the read target address from conflicting write operations that would otherwise modify the target memory block. Thus, during protection window 512a and window extension 512b, address comparator 418 of the master read queue entry 206 compares the target address of each write-type request received by IMC 206 to the read target address of the read-type request, as shown at block 622. If address comparator 418 determines that the target address of a write-type request matches (conflicts with) the read target address within address field 416, read unit 402 provides a retry partial response to the write-type request, as depicted at block 624.

As illustrated at block 626 and in FIG. 5A, the protection of the target memory block of the read-type request continues until the time epsilon has elapsed and window extension 512b has ended. Thereafter, read unit 402 deallocates the master read queue entry 412 allocated to the read-type request at block 628, ending tenure 530 of FIGS. 5A-5B. Meanwhile, as illustrated at block 630, the slave read queue entry 422 allocated to the read-type request awaits receipt of the target memory block within its data field 426. In response to receipt of the target memory block within data field 426, slave read queue entry 422 transmits the target memory block to the requesting master 232 utilizing the data tag contained within tag field 424, as shown at block 632. Thereafter, at block 634 read unit 402 deallocates the slave read queue entry 422 allocated to the read-type request, ending tenure 532, and the process ends at block 636.

Referring now to FIG. 7, there is depicted a high level logical flowchart of an exemplary process by which a master 232 services a load operation of an associated processor core 200 in accordance with the present invention. As illustrated, the process begins at block 700 in response to receipt by a master 232 of a load operation from one of the processor cores 200 supported by the L2 cache 230 containing the master 232. In response to receipt of the processor load operation, master 232 performs a lookup of the target address within its L2 cache directory 302 to determine if the requested memory block is already held within L2 cache array 300 (block 702). If the target address of the load operation hits in L2 cache directory 302 in a data-valid coherency state, the process proceeds to block 732, which depicts master 232 supplying the requested memory block to the requesting processor core 200. Thereafter, the process terminates at block 734.

Returning to block 704, in response to a determination by master 232 that the target address of the load operation missed in L2 cache directory 302, master 232 issues on local interconnect 114 a read-type request including a Ttype, the target address and a data tag identifying master 232 (block 706).

Master 232 then awaits the combined response (CR) for the read-type request. If the combined response is a Retry combined response (block 710), master 232 reissues the request, as indicated by the process returning to block 706. If, however, the combined response is an LPC Success combined response indicating that the target memory block of the read-type request will be supplied by an IMC 206 by reference to system memory 108 (block 712), the process proceeds to block 714, which is described below. If the combined response is not a Retry or an LPC Success but is instead an HPC Success combined response indicating that the target memory block will be supplied by the HPC for the target memory block (block 712), the process proceeds to block 730, which depicts master 232 awaiting receipt of the requested memory block. In response to receipt of the requested memory block, master 232 optionally caches the memory block within L2 array and directory 234 and supplies the requested memory block to the requesting processor core 200 (block 732). Thereafter, the process ends at block 734.

Referring now to block 714, in response to receipt of an LPC Success combined response, master 232 opens protection window 514 (FIG. 5B) and begins protecting the requested memory block against modification by write-type operations. Accordingly, as shown at blocks 716-718 and in FIG. 5B, if a write-type operation targeting the target memory address of the read operation is snooped by the L2 cache 230 containing master 232, master 232 protects the target memory block against modification by causing a retry partial response to be provided. As indicated at blocks 720-722, master 232 continues protecting the target memory block as shown at blocks 716-718 until the target memory block is received from the LPC (i.e., memory controller 206) and thereafter closes protection window 514. In response to receipt of the requested memory block, master 232 optionally caches the memory block within L2 array and directory 234 and supplies the requested memory block to the requesting processor core 200 (block 732). Thereafter, the process ends at block 734.

As has been described, the present invention provides an improved data processing system and method of performing read operations in a data processing system. In accordance with the present invention, when a read-type (e.g., READ) operation is serviced by an LPC (e.g., memory controller), the requested memory block is protected from modification by both the LPC and then the requesting master. By transferring responsibility for protecting the requested memory block from the LPC to the requesting master, the LPC is able to deallocate a master read queue entry responsible for protecting the requested memory block in advance of delivery of the requested memory block to the requesting master. Consequently, the master read queue entry is available for allocation to another read-type request, improving the rate at which read-type requests can be serviced by the LPC.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a data processing system including a requestor and a memory controller for a system memory, said method comprising:
   in response to receiving from the requestor a read-type request targeting a memory block in the system memory, the memory controller protecting said memory block from modification;

in response to an indication that said memory controller is responsible for servicing said read-type request, said memory controller transmitting said memory block to said requestor;

prior to receipt of said memory block by said requestor, said memory controller ending protection of said memory block from modification and said requestor beginning protection of said memory block from modification; and in response to receipt of said memory block, said requestor ending its protection of said memory block from modification.

2. The method of claim 1, wherein protecting said memory block from modification comprises providing a response to a write-type request targeting said memory block.

3. The method of claim 1, wherein said indication that said memory controller is responsible for servicing said read-type request comprises a combined response of the data processing system to said read-type request generated from partial responses of multiple snoopers.

4. The method of claim 3, wherein said requestor beginning protection of said memory black comprises said requestor beginning protection of said memory block in response to receipt of said combined response.

5. The method of claim 3, wherein said memory controller ending protection of said memory block comprises said memory controller ending protection of said memory block after a time interval has elapsed following receipt of said combined response by said memory controller, wherein the time interval is of sufficient duration to ensure that the requestor has assumed protection of said memory block.

6. The method of claim 1, wherein the memory controller protecting said memory block from modification comprises the memory controller beginning protection of said memory block prior to receipt of said indication that said memory controller is responsible for servicing said read-type request.

7. The method of claim 1, wherein:

said memory controller includes a master read queue entry allocated to said read-type request, and said memory controller ending protection of said memory block comprises deallocating said master read queue entry allocated to said read-type request.

8. A data processing system, comprising:

a plurality of requestors including a requestor;

a system memory;

a memory controller coupled to said system memory, wherein said memory controller, responsive to receipt from the requestor of a read-type request targeting a memory block in said system memory, protects said memory block from modification, and, responsive to an indication that said memory controller is responsible for servicing said read-type request, transmits said memory block to said requestor;

wherein prior to receipt of said memory block by said requestor, said memory controller ends protection of said memory block from modification and said requestor begins protection of said memory block from modification; and wherein responsive to receipt of said memory block, said requestor ends its protection of said memory block from modification by another of said plurality of requestors.

9. The data processing system of claim 8, wherein one of said memory controller and said requestor protects said memory block from modification by providing a response to any write-type requests targeting said memory block.

10. The data processing system of claim 8, wherein said indication that said memory controller is responsible for servicing said read-type request comprises a combined response of the data processing system to said read-type request generated from partial responses of multiple snoopers.

11. The data processing system of claim 10, wherein said requestor begins protection of said memory block in response to receipt of said combined response.

12. The data processing system of claim 10, wherein said memory controller ends protection of said memory block after a time interval has elapsed following receipt of said combined response by said memory controller, wherein the time interval is of sufficient duration to ensure that the requestor has assumed protection of said memory block.

13. The data processing system of claim 8, wherein the memory controller begins protection of said memory block prior to receipt of said indication that said memory controller is responsible for servicing said read-type request.

14. The data processing system of claim 8, wherein:

said memory controller includes a master read queue entry allocated to said read-type request, and said memory controller ends protection of said memory block upon deallocation of said master read queue entry allocated to said read-type request.

15. A processing unit, comprising:

at least one processor core; and a cache coupled to said at least one processor core, wherein said cache, responsive to receipt of an indication that its read-type request will be serviced by a memory controller of a system memory, begins protection of a memory block targeted by said read-type request from modification, and wherein responsive to receipt of said memory block, said cache ends its protection of said memory block from modification.

16. The processing unit of claim 15, wherein said indication that said memory controller is responsible for servicing said read-type request comprises a combined response to said read-type request of a data processing system containing said processing unit generated from partial responses of multiple snoopers.

17. The processing unit of claim 16, wherein said requestor begins protection of said memory block in response to receipt of said combined response.

18. The processing unit of claim 15, and further comprising said memory controller, wherein:

said memory controller, responsive to receipt of a read-type request targeting a memory block in said system memory, protects said memory block from modification, and, responsive to an indication that said memory controller is responsible for servicing said read-type request, transmits said memory block to a requestor; and said memory controller ends protection of said memory block from modification prior to receipt of said memory block by said requestor.

19. The processing unit of claim 18, wherein:
said memory controller begins protection of said memory block prior to receipt of said indication that said memory controller is responsible for servicing said read-type request; and
said memory controller ends protection of said memory block after a time interval has elapsed following receipt of said indication by said memory controller, wherein the time interval is of sufficient duration to ensure that the requestor has assumed protection of said memory block.

20. The processing unit of claim 18, wherein:
said memory controller includes a master read queue entry allocated to said read-type request, and
said memory controller ends protection of said memory block upon deallocation of said master read queue entry allocated to said read-type request.

* * * * *